United States Patent [19]

Baney et al.

[11] Patent Number: 4,737,552

[45] Date of Patent: Apr. 12, 1988

[54] CERAMIC MATERIALS FROM POLYCARBOSILANES

[75] Inventors: Ronald H. Baney; Gary T. Burns, both of Midland, Mich.

[73] Assignee: Dow Corning Corporation, Midland, Mich.

[21] Appl. No.: 880,412

[22] Filed: Jun. 30, 1986

[51] Int. Cl.[4] .................... C08F 283/00; C04B 35/56
[52] U.S. Cl. .................................. 525/478; 525/479; 528/15; 528/31; 528/32; 501/88; 501/90
[58] Field of Search ............... 423/345; 556/415, 431, 556/479; 501/88, 90; 528/32, 15, 31; 525/478, 479

[56] References Cited

U.S. PATENT DOCUMENTS

| | | | |
|---|---|---|---|
| 2,823,218 | 2/1958 | Speier et al. | 556/415 |
| 3,419,593 | 12/1968 | Willing | 556/479 |
| 4,052,430 | 10/1977 | Yajima et al. | 528/32 |
| 4,100,233 | 7/1978 | Yajima et al. | 423/345 |
| 4,105,455 | 8/1978 | Koga et al. | 501/88 |
| 4,220,600 | 9/1980 | Yajima et al. | 423/345 |
| 4,283,376 | 8/1981 | Yajima et al. | 423/345 |
| 4,377,677 | 3/1983 | Iwai et al. | 556/430 |
| 4,414,403 | 11/1983 | Schilling, Jr. et al. | 501/88 |
| 4,472,591 | 9/1984 | Schilling, Jr. et al. | 528/12 |
| 4,497,787 | 2/1985 | Schilling, Jr. et al. | 501/88 |
| 4,650,837 | 3/1987 | Seyferth et al. | 528/32 |
| 4,681,860 | 7/1987 | Bujalski | 501/90 |

*Primary Examiner*—Mark L. Bell
*Assistant Examiner*—Anthony Green
*Attorney, Agent, or Firm*—Robert L. McKellar

[57] ABSTRACT

A method is disclosed for the preparation of ceramic materials with reduced oxygen levels from polycarbosilanes by the pyrolysis of a mixture of a polycarbosilane, a hydrosilylation catalyst, and an unsaturated compound selected from the group consisting of reactive diolefins, reactive alkynes, polyolefins, vinylsilanes, and unaturated siloxanes where the mixture is rendered infusible prior to pyrolysis by heating to relatively low temperatures in an inert atmosphere. This invention is especially well suited for the production of ceramic fibers from polycarbosilanes.

32 Claims, No Drawings

CERAMIC MATERIALS FROM POLYCARBOSILANES

BACKGROUND OF THE INVENTION

This invention relates to the preparation of ceramic materials with reduced oxygen levels from polycarbosilanes by the pyrolysis of a mixture of a polycarbosilane, a hydrosilylation catalyst, and an unsaturated compound selected from the group consisting of reactive diolefins, reactive alkynes, polyolefins, vinylsilanes, and unsaturated siloxanes where the mixture is rendered infusible prior to pyrolysis by heating to relatively low temperatures in an inert atmosphere. This invention is especially well suited for the production of ceramic fibers from polycarbosilanes.

Generally, in preparing a shaped ceramic article such as a fiber from a preceramic polymer by pyrolysis at elevated temperatures, it is necessary, prior to pyrolysis, to render the shaped article infusible. Otherwise the shaped article will melt upon pyrolysis and thus the desired shape will be destroyed. The most common method of rendering the shaped article infusible has been an oxidation treatment. This method has the disadvantage of incorporating large amounts of oxygen in the resulting ceramic article. For example, standard grade Nicalon ceramic fibers, prepared from polycarbosilanes by Nippon Carbon Company Ltd, Tokyo, Japan, normally contain about 10-15 weight percent oxygen. High oxygen content results in decreased thermal stability of the ceramic materials at elevated temperatures.

Ceramic materials prepared from polycarbosilanes are known in the art. Verbeek et al. in German Application Publication No. 2,236,078, which is hereby incorporated by reference, prepared ceramic materials by firing a polycarbosilane prepared by the pyrolysis of monosilanes at elevated temperatures in an inert atmosphere. Linear, high molecular weight polymers such as polyethylene oxide, polyisobutylene, polymethylmethacrylate, polyisoprene, and polystyrene were reported to improve the fiber spinning characteristics of the polycarbosilanes. The polycarbosilane fibers were rendered infusible prior to pyrolysis by either thermal, oxidation, sulfidation, or hydrolysis treatment. The ceramic fibers were reported to contain between 0 and 30 weight percent oxygen but no details were given.

Yajima et al. in U.S. Pat. Nos. 4,052,430 (Oct. 4, 1977) and 4,100,233 (July 11, 1978), which are both hereby incorporated by reference, prepared ceramic materials by the pyrolysis of polycarbosilanes in an inert atmosphere or in a vacuum at an elevated temperature. The polycarbosilanes were prepared by thermally decomposing and polycondensing polysilanes. Polycarbosilane fibers were treated for 2–48 hours at 350°–800° C. under vacuum prior to pyrolysis to remove low molecular weight material. In some cases the fibers were first exposed to an oxidizing atmosphere at 50°–400° C. to form an oxide layer on the fibers and then treated under vacuum at 350°–800° C. The oxygen content of the resulting ceramic fibers was not reported.

Yajima et al. in U.S. Pat. Nos. 4,220,600 (Sept. 2, 1980) and 4,283,376 (Aug. 11, 1981), which are both hereby incorporated by reference, prepared ceramic materials by the pyrolysis of polycarbosilanes partly containing siloxane bonds at an elevated temperature under an inert atmosphere or a vacuum. These polycarbosilanes were prepared by heating polysilanes in the presence of about 0.01 to 15 weight percent of a polyborosiloxane in an inert atmosphere. Polycarbosilane fibers were rendered infusible prior to pyrolysis by either treatment with an oxidizing atmosphere at about 50°–400° C. to form an oxide layer on the fiber surface or by irradiation with gamma-rays or an electron beam under an oxidizing or non-oxidizing atmosphere. The oxygen content of the resulting ceramic fibers were in the range of 0.01 to 10 weight percent by chemical analysis. Oxygen in the form of silica could be further removed from the ceramic fiber by treatment in a hydrofluoric acid solution.

Iwai et al. in U.S. Pat. No. 4,377,677 (Mar. 22, 1983), which is hereby incorporated by reference, also produced ceramic materials by the pyrolysis of polycarbosilanes at elevated temperatures under an inert atmosphere or vacuum. The polycarbosilanes of Iwai were prepared by heating a polysilane at 50°–600° C. in an inert gas, distilling out a low molecular weight polycarbosilane fraction and then polymerizing the distilled fraction at 250° to 500° C. in an inert atmosphere. Polycarbosilane fibers were rendered infusible prior to pyrolysis by heating at relatively low temperatures in air. The oxygen content of the resulting ceramic fibers was not reported.

Schilling et al. in U.S. Pat. No. 4,414,403 (Nov. 8, 1983), which is hereby incorporated by reference, produced ceramic material by the pyrolysis of branched polycarbosilanes at elevated temperatures under an inert atmosphere or vacuum. The branched polycarbosilanes were prepared by reacting monosilanes with an active metal in an inert solvent at elevated temperatures where at least some of the monosilanes contained vinyl groups or halomethyl groups capable of forming branching during the polymerization. Methods of rendering the material infusible were not discussed.

Yajima et al., *J. Mat. Sci.*, 13, 2569 (1978), Yajima, *Bull. Amer. Ceram. Soc.*, 62, 893 (1983), and Hasegawa et al., *J. Mat. Sci.*, 18, 3633 (1983) also discuss polycarbosilanes which are useful as preceramic polymers for preparing silicon carbide ceramics. In the *Bull. Amer. Ceram. Soc.* article Yajima prepared ceramic fibers from polycarbosilanes which had been rendered infusible prior to pyrolysis by heating in air at 190° C. The resulting fibers contained 15.5 weight percent oxygen most of which was thought to be incorporated into the fiber during the curing step.

What has been discovered is a new method of rendering preceramic polycarbosilane polymers infusible prior to pyrolysis which results in a significantly reduced oxygen content in the ceramic materials produced from the pyrolysis of these infusible polycarbosilane polymers. This method represents a significant advance in the art of preparing ceramic materials or articles, especially in the art of preparing ceramic fibers.

THE INVENTION

This invention relates to a method of rendering a preceramic polycarbosilane composition infusible prior to pyrolysis, which method comprises treating the preceramic polycarbosilane composition at a temperature of 150° to 400° C. under an inert atmosphere or vacuum for a time sufficient to render the preceramic polycarbosilane composition infusible wherein the preceramic polycarbosilane composition contains (1) a polycarbosilane, (2) a hydrosilylation catalyst, and (3) an unsaturated compound selected from the group consisting of reactive alkynes, polyolefins, vinylsiloxanes, and unsaturated siloxanes.

This invention also relates to a method of rendering a preceramic polycarbosilane composition infusible prior to pyrolysis, which method comprises treating the preceramic polycarbosilane composition with a gas selected from the group consisting of reactive diolefins, reactive alkynes, and vinylsilanes at a temperature of 150° to 400° C. for a time sufficient to render the preceramic polycarbosilane composition infusible wherein the preceramic polycarbosilane composition contains (1) a polycarbosilane and (2) a hydrosilylation catalyst.

The preceramic polycarbosilane compositions of this invention, when converted to ceramic materials at elevated temperatures under an inert atmosphere or vacuum, contain significantly less oxygen than conventional ceramic materials prepared from polycarbosilanes under similar pyrolysis conditions.

This invention also relates to a preceramic polymer composition consisting essentially of (1) a polycarbosilane, (2) a hydrosilylation catalyst, and (3) an unsaturated compound selected from the group consisting of reactive diolefins, reactive alkynes, polyolefins, vinylsilanes, and unsaturated siloxanes.

The polycarbosilanes suitable for use in this present invention must contain at least 0.1 weight percent Si-H groups. It is generally preferred that the polycarbosilane contain between 0.2 and 5.0 weight percent Si-H groups. These polycarbosilanes contain Si and C as the main skeleton elements in the form of (SiCH$_2$) units. The polycarbosilanes useful in this invention may also contain oxygen as a skeleton element in addition to Si and C as the main skeleton elements but it is preferred that the oxygen content of the polycarbosilane be kept to a minimum. It is preferred that the amount of oxygen present is less than about 5 weight percent and most preferably less than 1 weight percent. Where low oxygen-containing ceramic materials are desired, the oxygen content of the polycarbosilanes should be kept to a minimum. Other elements may also be present as main skeleton elements in addition to Si, C, and O. However, these other elements should preferably be present at less than about 1 weight percent and most preferably only be present at trace levels (i.e. less than 0.1 weight percent).

Suitable polycarbosilanes may be prepared by methods well known in the art. For example, suitable polycarbosilanes may be prepared from monosilanes by pyrolysis at 400° to 1200° C. as described by Verbeek et al. in German Application Publication No. 2,236,078. Suitable polycarbosilanes may also be prepared from polysilanes by heating and polycondensing the polysilanes at 300° to 2000° C. under an inert atmosphere or vacuum as described by Yajima et al. in U.S. Pat. Nos. 4,052,430 and 4,100,233. Other suitable polycarbosilanes may be prepared by heating a mixture of polysilanes with about 0.01 to 15 weight percent of a phenylborosilane under an inert atmosphere as described in Yajima et al. in U.S. Pat. Nos. 4,220,600 and 4,283,376. Still other suitable polycarbosilanes may be prepared by the method of Iwai et al. U.S. Pat. No. 4,377,677 wherein an improved procedure for preparing polycarbosilanes from polysilanes is disclosed. Other polycarbosilanes containing the required SiH groups and capable of being converted to ceramic material by pyrolysis at elevated temperatures under an inert atmosphere or vacuum are also useful in the present invention.

Preferred polycarbosilanes for the practice of this invention are prepared from the thermal decomposition and polycondensation of polysilanes as described in U.S. Pat. Nos. 4,052,430 and 4,100,233.

More preferred polycarbosilanes are prepared by thermally decomposing and polycondensing a polysilane or mixture of polysilanes by heating said polysilane or mixture of polysilanes at a temperature of 300° to 2000° C. in an inert gas, hydrogen, or vacuum wherein said polysilane or polysilanes are selected from the group consisting of cyclic polysilanes of the general formula $(R^1R^2Si_n)$ 

and linear polysilanes of the general formula

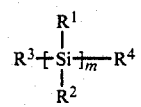

where n is greater than or equal to 4; where m is greater than or equal to 2; and where $R^1$, $R^2$, $R^3$, and $R^4$ are independently selected from the group consisting of hydrogen, alkyl groups containing 1 to 4 carbon atoms, phenyl, —Si($R^5$)$_3$ groups where $R^5$ is a alkyl group containing 1 to 4 carbon atoms, and halogen atoms. Examples of $R^1$, $R^2$, $R^3$, and $R^4$ as alkyl groups and $R^5$ include methyl, ethyl, propyl and butyl groups. Examples of $R^1$, $R^2$, $R^3$, and $R^4$ as halogens include chlorine and bromine with chlorine being preferred. The most preferred polycarbosilanes are prepared by the thermal decomposition and polycondensation of dodecamethylcyclohexasilane or polydimethylsilane.

The actual method of preparing the polycarbosilanes for use in this invention is not critical. The polycarbosilanes should be capable of being converted to silicon carbide-containing ceramics upon pyrolysis to elevated temperatures in an inert atmosphere or vacuum. Preferably the polycarbosilanes used in the practice of this invention have a softening point of about 50° to 300° C. and most preferably in the range of 70° to 200° C.

The required hydrosilylation catalysts are well known in the art. Such catalysts are generally of the platinum metal group which includes platinum, palladium, ruthenium, and rhodium. Suitable platinum catalysts include chloroplatinic acid as described in Speier, U.S. Pat. No. 2,823,218 (issued Feb. 11, 1958) and the reaction product between chloroplatinic acid and a organosilicon compound containing at least one monovalent hydrocarbon or monovalent halohydrocarbon group with a terminal aliphatic unsaturation as described by Willing in U.S. Pat. No. 3,419,593 (issued Dec. 31, 1968), which are both hereby incorporated by reference. The platinum catalyst of U.S. Pat. No. 3,419,593 is more fully described as the reaction product of chloroplatinic acid and at least one organosilicon compound of the formula

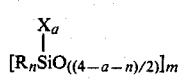

where R is selected from the group consisting of monovalent hydrocarbon and monovalent halohydrocarbon radicals, at least one of the R groups containing terminal aliphatic unsaturation; X is a hydrolyzable group; n has an average value of 1.5 to 4; m has an average value of 1 to 20; and a has an average value of 0 to 2.5. One preferred platinum catalyst is prepared from chloroplatinic acid and $[(CH_3)_2(CH_2=CH)Si]_2O$. Rhodium catalysts such as tris(triphenylphosphine)rhodium(I) chloride and tris(di-n-butylsulfide)rhodium(I) chloride are suitable for use in this invention. Other known hydrosilylation catalysts may also be used in the practice of this invention. Generally, the platinum- and rhodium-containing hydrosilylation catalysts are preferred. The hydrosilylation catalyst is normally present at metal level of about one part per million (ppm) to about 0.5 weight percent based on the weight of the polycarbosilane. It is preferred that the hydrosilylation catalyst is present at a metal level of about ten parts per million (ppm) to about 0.1 weight percent based on the weight of the polycarbosilane. Higher catalyst levels may be used but offer no additional advantage.

The unsaturated compound component of the composition of this invention must be capable of undergoing a hydrosilylation reaction with the Si-H groups of the polycarbosilane to crosslink the polycarbosilane. Therefore, reactive unsaturated compounds which contain at least two double bonds or at least one triple bond are generally suitable. Such unsaturated compounds include reactive diolefins, reactive alkynes, polyolefins, vinylsilanes, and unsaturated siloxanes. Examples of polyolefins include polyisobutylene, polybutadiene, and polyisoprene. The vinylsilanes must include at least two vinyl groups. Examples of suitable vinylsilanes include $(CH_2=CH)_2Si(CH_3)_2$, $CH_3(CH_2=CH)_2SiCH_2CH_2Si(CH_2=CH)_2CH_3$, and the like. Examples of suitable unsaturated siloxanes include vinyl- and allyl-containing siloxanes containing at least two unsaturated groups. Generally the polyolefins are preferred. The unsaturated compound is usually employed at levels of about 0.5 to about 20 weight percent based on the polycarbosilane weight. Higher levels of the unsaturated compound may be used but such levels do not appear to offer any additional advantage. It is generally preferred that the unsaturated compound be present at a level of about 2 to 5 weight percent based on the polycarbosilane weight. The polyolefins may also act as spinning aids in the preparation of fibers.

Normally the various components are mixed together prior to forming the desired shaped article. Thus a preceramic polycarbosilane mixture containing a polycarbosilane, a hydrosilylation catalysts, and an unsaturated compound is first obtained and then formed into the desired shaped article such as a fiber. Other procedures are, however, possible. For example, a preceramic polycarbosilane fiber could be formed first and then the external surfaces coated with a mixture of the hydrosilylation catalyst and the unsaturated compound. Or the external surfaces of a fiber made from a mixture of the polycarbosilane and the hydrosilylation catalyst could be coated with the unsaturated compound or exposed to a reactive, unsaturated compound such as vinylsilanes, diolefinic compounds such as butadiene, or reactive alkyne compounds such as acetylene in the gas phase at the desired treatment temperature.

The preceramic polycarbosilane compositions are treated at a temperature of 150° to 400° C. for a time sufficient to render the preceramic polycarbosilane compositions infusible. Generally, the temperature during the thermal treatment step is raised slowly from room temperature to the final treatment temperature of 150° to 400° C. Generally, a final treatment temperature of 300° to 400° C. is preferred. The rate of temperature increase is controlled so that the preceramic polycarbosilane composition does not melt or fuse as the temperature is raised to the final treatment temperature. What is meant by "infusible" in this specification is that the thermally treated preceramic polycarbosilane composition, when heated rapidly up to the pyrolysis temperature, will not fuse together. A crude screen for infusibility is provided by the solubility of the preceramic polycarbosilane composition in toluene. Prior to the thermal cure, the preceramic polycarbosilane compositions of this invention are almost completely soluble in toluene. The infusible preceramic polycarbosilane compositions obtained by the method of this invention are either insoluble in toluene or have only limited solubility in toluene. The time required to render the preceramic polycarbosilane composition infusible by the method of this invention will depend, in part, on the size of the preceramic polycarbosilane composition article, the actual temperature of the thermal treatment, and the specific polycarbosilane preceramic polymer, hydrosilylation catalyst, and unsaturated compound employed. Normally, a time period ranging from about five minutes to about twenty four hours will be sufficient to render the preceramic polycarbosilane compositions infusible. Longer thermal treatment times can be employed. The optimum thermal treatment time can be determined by routine experimentation.

When the preceramic polycarbosilane composition is in the shape of a formed object such as a fiber it is not necessary to render the entire shaped article infusible. Rather only the outer surfaces, and sufficient interior portions directly adjacent to the outer surfaces, need be rendered infusible. The interior portion of the shaped article may be cured during the pyrolysis of the shaped article to elevated temperature. Simply rendering the exterior infusible will prevent the shaped articles from fusing together during the pyrolysis unless a break in the exterior surface occurs which allows the uncured interior to leak out.

The preceramic polycarbosilane composition may be rendered infusible in a vacuum or under an inert atmosphere. For purposes of this invention an "inert" atmosphere contains less than about 100 ppm oxygen. In order to minimize the incorporation of oxygen, exposure to oxygen should be minimized during the thermal treatment step as well as other steps in the preparation of the ceramic material.

After the preceramic polycarbosilane composition has been rendered infusible, the infusible preceramic polycarbosilane composition is fired to an elevated temperature of at least 750° C. in an inert atmosphere, vacuum or ammonia-containing atmosphere until the mixture is converted to a ceramic material. Preferably the pyrolysis temperature is from about 1000° C. to about 1600° C. Since the preceramic polycarbosilane compositions of this invention have been rendered infusible prior to pyrolysis, the pyrolysis step may be carried out by quickly raising the temperature to the desired level. If the preceramic polycarbosilane composition is of sufficient viscosity or if it possesses a sufficiently low melt temperature, it can be shaped, rendered infusible, and then finally pyrolyzed to give a ceramic shaped article such as a fiber. Preferably the preceramic polycarbosilane compositions used in the practice of this invention have a softening temperature of about 50° to 300° C. and most preferably in the range of 70° to 200°

C. Such a softening temperature allows for the formation of preceramic fibers by known spinning techniques.

So that those skilled in the art can better appreciate and understand the invention, the following examples are given. Unless otherwise indicated, all percentages are by weight. The percentages of the hydrosilylation catalyst and the unsaturated compounds in the preceramic polycarbosilane mixtures are based on the weight of the polycarbosilane. The following materials and procedures were employed unless indicated otherwise.

The polycarbosilane used was from Nippon Carbon Company Ltd, 2-6-1, Hachi-Chobari, Chuo-Ku, Tokyo 104, Japan and was used as received. This polycarbosilane is thought to have been prepared from the sodium coupling of dimethyldichlorosilane followed by the thermal decomposition and polycondensation of the resulting polydimethylsilane as described in Yajima et al., *J. Mat. Sci.*, 13, 2569 (1978), Yajima, *Bull. Amer. Ceram. Soc.*, 62, 893 (1983), and U.S. Pat. Nos. 4,052,430 and 4,100,233. The Si-H content was 0.60 weight percent and was determined by titration of the acetic acid liberated in the reaction between the Si-H group and mercuric acetate. The polycarbosilane contained 0.42 weight percent oxygen. All oxygen analyses were determined using a Leco Oxygen Analyzer equipped with an Oxygen Determinator 316 (Model 783700) and a Electrode Furnace EF100 (Model 77600) manufactured by Leco Corporation, St. Joseph, Michigan. Elemental analysis of the polycarbosilane was 40.6 weight percent carbon, 9.4 weight percent hydrogen, and 50.5 weight percent silicon. Silicon was determined by a fusion technique which consisted of converting the silicon material to soluble forms of silicon and then analyzing the soluble material quantitatively for total silicon by atomic absorption spectrometry. Carbon and hydrogen were determined on a C, H, N Elemental Analyzer, model 1106, manufactured by Carlo Erba Strumentazione of Italy. The molecular weight was 1345 g/mole (number average) and 3139 g/mole (weight average) as determined by gel permeation chromatography using a four weight percent of the polycarbosilane in a toluene solution with a toluene elutant at a flow rate of 1.5 ml/minute and a differential refractometer detector. Molecular weight measurements were relative to a polystyrene standard. The molecular weight polydispersity was 2.3. The polycarbosilane had a glass transition temperature of 210° C. as determined on a DuPont Instruments Thermoanalyzer Model 1090 equipped with a Model 1091 DuPont Disk Memory and a DuPont Model 943 Thermomechanical Analyzer. The glass transition temperature is related to the softening temperature.

Tris(triphenylphosphine)rhodium(I) chloride, cis-polybutadiene (average molecular weight of 200,000 to 300,000 g/mole), cis-polyisoprene and polybutadiene (containing about 45 percent vinyl and 55 percent cis- and trans-1,4 addition) were obtained from Aldrich Chemical Co., Milwaukee, Wisconsin and were used as received. Instrument grade butadiene from Matheson Gas Products, Joliet, Illinois was used as received. Toluene was distilled from sodium metal under an argon atmosphere and stored over molecular sieves. The vinylsiloxane employed was a liner polymer of the general formula $[(CH_2=CH)CH_3SiO]_x$ which contained a minimum of 27.5 percent vinyl and had a viscosity of 20 to 80 centistokes at 25° C.

Fibers were prepared in a dry box with oxygen and moisture levels less than 5 ppm using the following general procedures. Stock solutions of the polycarbosilane and unsaturated compound were prepared in toluene under inert atmospheres. Aliquots of the stock solutions were added to a weighed amount of catalyst to prepare solutions of the desired composition. Toluene was allowed to evaporate under a nitrogen atmosphere until the viscosity of the composition was suitable for dry spinning. Fibers were drawn from the toluene solution using one of two procedures. In the first method the concentrated toluene solution was loaded into a spinning head and weight applied forcing the solution to be extruded through the spinnerette. The extruded fiber was allowed to fall about three feet and was then collected on a take up wheel. In the second fiber spinning method, the concentrated toluene solution was placed in a aluminum pan inside the dry box. A glass rod or syringe needle was dipped into the solution and fibers formed by slowly pulling the rod or syringe out of the solution. When the unsaturated compound was polyisoprene, fibers formed by this pulling method could be collected on an overhead rotating drum. Fibers prepared by these methods had an average diameter of about eleven microns.

Unless indicated otherwise, preceramic polycarbosilane mixtures were converted to ceramic materials by pyrolysis in a Lindberg tube furnace (Heavy Duty SB Type S4877A) by heating to 1200° C. at a rate of about 5° C./min under an argon atmosphere. The temperature was held at 1200° C. for about 40 minutes before cooling to room temperature.

EXAMPLE 1

Fiber samples of the following compositions were prepared: (A) polycarbosilane and 0.13 percent platinum in the form of the reaction product of chloroplatinic acid and excess $[(CH_3)_2(CH_2=CH)Si]_2O$ (0.67 percent platinum in the catalyst/siloxane solution); (B) polycarbosilane and 0.12 percent platinum as bis(diethylsulfide)platinium(II) chloride; and (C) polycarbosilane alone. The fibers were heated from room temperature to 388° C. over a four hour period and held at 388° C. for four hours in a curing oven while exposed to a continuous stream of butadiene. Fibers A and B containing platinum catalyst were rendered infusible and remained intact with no evidence of melting or fusion. Fibers of pure polycarbosilane were completely fused together with no evidence of curing. The oxygen content of the resulting heat treated materials was 6.6, 3.3 and 3.2 percent, respectively. The higher oxygen content of composition A is thought to be due to the presence of the disiloxane.

EXAMPLE 2

Fibers prepared from polycarbosilane, 2 percent polyisoprene, and 0.077 percent rhodium as tris(triphenylphosphine)rhodium(I) chloride were heated under an argon atmosphere in the Lindberg tube furnace using the following temperature program: 25° to 148° C. at a rate of 2° C./min; 148° to 230° C. at a rate of 0.34° C./min; 230° to 301° C. at a rate of 0.20° C./min; 301° to 400° C. at a rate of 0.41° C./min; 400° to 1210° C. at a rate of 4.5° C./min; and held at 1210° C. for 40 minutes before cooling to room temperature. The total time at a temperature less than 400° C. was about 15 hours. The resulting ceramic fibers were obtained as individual fibers with only a small amount of matting on the underside of the fiber bundle. The oxygen content of the ceramic fibers was 1.92 percent.

EXAMPLE 3

Fiber samples of the following compositions were prepared: (A) polycarbosilane, 4 percent polyisoprene, and 0.057 percent rhodium as tris(triphenylphosphine)rhodium(I) chloride; (B) polycarbosilane, 4 percent polyisoprene, and 0.11 percent platinum as bis(diethylsulfide)platinum(II) chloride; (C) polycarbosilane, 4 percent cis-polybutadiene, and 0.14 percent platinum as bis(diethylsulfide)platinum(II) chloride; (D) polycarbosilane, 4 percent cis-polybutadiene, and 0.14 percent platinum as chloroplatinic acid; and (E) polycarbosilane alone. The fibers were cured under argon by heating from room temperature to 35° C. at a rate of 1.7° C./min, 35° to 388° C. at a rate of 1.47° C./min, and holding at 388° C. for 12 hours before cooling to room temperature. The cured fibers were then pyrolyzed to 1200° C. under argon. All fiber samples except E were rendered infusible by the heat treatment to 388° C. and remained as individual, discrete fibers after being converted to ceramics. Fibers of pure polycarbosilane (E) were not rendered infusible by the heat treatment; they melted and fused together during the pyrolysis to 1200° C. The following results were obtained on the ceramic fibers.

| Fiber Sample | Ceramic Yield, % | Oxygen, % |
| --- | --- | --- |
| A | 67.7 | 2.93 |
| B | 70.9 | 2.41 |
| C | 70.5 | 1.96 |
| D | 73.2 | 2.09 |

EXAMPLE 4

Fiber samples of the following compositions were prepared: (A) polycarbosilane, 2 percent cis-polyisoprene, and 0.078 percent rhodium as tris(triphenylphosphine)rhodium(I) chloride; and (B) polycarbosilane, 4 percent cis-polyisoprene, and 0.077 percent rhodium as tris(triphenylphosphine)rhodium(I) chloride. Uncured fibers A and B contained 0.67 and 0.63 percent oxygen, respectively. The fibers were cured under argon using the following temperature program: room temperature to 100° C. at a rate of 1.25° C./min, 100° to 150° C. at a rate of 0.8° C./min, 150° to 200° C. at a rate of 0.14° C./min, 200° to 250° C. at a rate of 0.10° C./min, 250° to 350° C. at a rate of 0.21° C./min, and held at 350° C. for three hours before cooling to room temperature. The cured, infusible fibers A and B lost about 10 percent weight relative to the uncured fibers and contained 1.78 and 2.05 percent oxygen, respectively. The cured fibers were then pyrolyzed to 1200° C. under argon. All fiber samples had been rendered infusible by the heat treatment to 350° C. and remained as individual, discrete fibers after being converted to ceramic fibers. The following results were obtained on the ceramic fibers.

| Fiber Sample | Ceramic Yield, % | Oxygen, % |
| --- | --- | --- |
| A | 78.7 | 3.59 |
| B | 78.7 | 3.33 |

EXAMPLE 5

Fiber samples of the following compositions were prepared: (A) polycarbosilane, 2 percent cis-polyisoprene, and 0.078 percent rhodium as tris(triphenylphosphine)rhodium(I) chloride; and (B) polycarbosilane, 2 percent cis-polybutadiene, and 0.084 percent rhodium as tris(triphenylphosphine)rhodium(I) chloride. The fibers were cured under argon using the following temperature program: room temperature to 100° C. at a rate of 1.25° C./min, 100° to 150° C. at a rate of 0.8° C./min, 150° to 200° C. at a rate of 0.42° C./min, 200° to 250° C. at a rate of 0.14° C./min, 250° to 350° C. at a rate of 0.28° C./min, and held at 350° C. for three hours before cooling to room temperature. The cured, infusible fiber B contained 2.72 percent oxygen; the oxygen content of fiber A was not determined. The cured fibers were then pyrolyzed to 1200° C. under argon. All fiber samples had been rendered infusible by the heat treatment to 350° C. and remained as individual, discrete fibers after being converted to ceramics. The following results were obtained on the ceramic fibers.

| Fiber Sample | Ceramic Yield, % | Oxygen, % |
| --- | --- | --- |
| A | 72.6 | 4.13 |
| B | 74.6 | 3.89 |

EXAMPLE 6

The ceramic fibers A of Example 5, containing 4.1 percent oxygen, and standard Nicalon ceramic fibers from Nippon Carbon, containing about 12 percent oxygen and prepared from air cured polycarbosilane, were heated to 1500° C. in an argon atmosphere and held at 1500° C. for two hours. Fibers A experienced a 7.0 percent weight reduction whereas the Nicalon fibers lost 16.0 percent. This clearly demonstrates the superior thermal stability of ceramic materials produced by the present invention.

EXAMPLE 7

Fibers containing polycarbosilane, 2.2 percent poly(1-trimethylsilyl-2-methyl)acetylene, and 0.68 percent rhodium as tris(triphenylphosphine)rhodium(I) chloride were prepared and cured under argon using the temperature program described in Example 6. The poly(1-trimethylsilyl-2-methyl)acetylene was prepared using the procedure of Masuda et al. *Macromol.*, 18, 841 (1985). The cured, infusible fibers retained 95.5 percent of their weight relative to the uncured fibers and contained 3.13 percent oxygen. The cured fibers were then pyrolyzed to 1200° C. under argon. The fiber sample had been rendered infusible by heat treatment to 350° C. and remained as individual, discrete fibers after being converted to ceramics. The ceramic yield was 70 percent and the oxygen content was 5.2 percent.

In Examples 8 through 14, a mixture of polycarbosilane, hydrosilylation catalyst, and unsaturated compound were prepared and transferred to a heavy walled glass ampoule. The mixtures were degassed using several freeze-thaw cycles and then sealed under vacuum. The sealed samples were then thermally treated. After cooling the treated samples to liquid nitrogen temperature, the ampoules were opened. Using extraction techniques, the toluene solubility of the mixtures were determined. Prior to heat treatment the polycarbosilane was completely soluble in toluene. Limited or partial solubility indicates that the polycarbosilane mixture has cured under the conditions employed.

EXAMPLE 8

The following mixtures were treated as described above: (A) 0.54 g polycarbosilane, 0.057 g (10.5 percent) [(CH$_3$)$_2$(CH$_2$=CH)Si]$_2$O, and 10 microliters of a 0.1M isopropanol solution of chloroplatinic acid (0.036 percent Pt); (B) 0.48 g polycarbosilane, 0.060 g (12.5 percent) vinylsiloxane, and 10 microliters of a 0.1M isopropanol solution of chloroplatinic acid (0.041 percent Pt); (C) 0.46 g polycarbosilane, 0.060 g (13.0 percent) [(CH$_3$)$_2$(CH$_2$=CH)Si]$_2$O, and 0.012 g of the reaction product of chloroplatinic acid and excess [(CH$_3$)$_2$(CH$_2$=CH)Si]$_2$O (0.0010 percent as Pt; the catalyst/siloxane mixture itself contained 4.02 percent Pt); (D) 0.508 g polycarbosilane, 0.019 g (3.7 percent) [(CH$_3$)$_2$(CH$_2$=CH)Si]$_2$O, and 10 microliters of a 0.1M isopropanol solution of chloroplatinic acid (0.041 percent Pt); (E) 0.453 g polycarbosilane, 0.012 g (2.6 percent) vinylsiloxane, and 10 microliters of a 0.1M isopropanol solution of chloroplatinic acid (0.043 percent Pt); (F) 0.52 g polycarbosilane and 10 microliters of a 0.1M isopropanol solution of chloroplatinic acid (0.038 percent Pt); and (G) 0.40 g polycarbosilane and 0.123 g (30.7 percent) [(CH$_3$)$_2$(CH$_2$=CH)Si]$_2$O. The vinylsiloxane used in B and E was a linear polymer of the general formula [(CH$_2$=CH)CH$_3$SiO]$_x$ which contained a minimum of 27.5 percent vinyl and had a viscosity of 20 to 80 centistokes at 25° C. The mixtures were treated at 180° C. for 16 hours except that G was treated at 180° C. for 18 hours. The following results were obtained. In the Table "+" indicates the component was present in the mixture and "−" indicates it was absent.

| Sample | Unsaturated Compound | Catalyst | Toluene Solubility |
| --- | --- | --- | --- |
| A | + | + | partial |
| B | + | + | partial |
| C | + | + | partial |
| D | + | + | partial |
| E | + | + | partial |
| F | − | + | soluble |
| G | + | − | soluble |

Where the "Toluene Solubility" is labeled "partial", a significant amount of insoluble material was found indicating that there was sufficient cure to render the mixtures infusible. Under the relatively mild cure conditions employed, both the unsaturated compound and the hydrosilylation catalyst are necessary to obtain sufficient cure.

EXAMPLE 9

This example is included for comparison purposes only. The following mixtures were treated as described in Example 8: (A) 1.28 g polycarbosilane, 0.091 g (7.1 percent) of a Si-OH endcapped, 55-90 centistoke polydimethylsiloxane fluid, and 15 microliters of a 0.1M isopropanol solution of chloroplatinic acid (0.022 percent Pt) and (B) 1.268 g polycarbosilane, 0.052 g (4.1 percent) of a 200 centistoke polydimethylsiloxane fluid, and 15 microliters of a 0.1M isopropanol solution of chloroplatinic acid (0.023 percent Pt). The mixtures were treated at 180° C. for 64 hours. Both mixtures were completely soluble in toluene after the heat treatment. Therefore, under the relatively mild thermal conditions employed, the polycarbosilane/siloxanes/catalyst mixtures do not cure.

EXAMPLE 10

The following mixtures were treated as described in Example 8: (A) 2.88 g polycarbosilane, 0.091 g (3.16 percent) vinylsiloxane, and 20 microliters of a 0.1M isopropanol solution of chloroplatinic acid (0.014 percent as Pt); and (B) 1.414 g polycarbosilane, 0.066 g (4.67 percent) polybutadiene (45 percent vinyl), and 12 microliters of a 0.1M isopropanol solution of chloroplatinic acid (0.016 percent as Pt). The vinylsiloxane used in A was a linear polymer of the general formula [(CH$_2$=CH)CH$_3$SiO]$_x$ which contained a minimum of percent vinyl and had a viscosity of 20 to 80 centistokes at 25° C. Both mixtures were heated treated at 180° C. for 64 hours. A and B contained 19.4 and 27.4 percent toluene insoluble material, respectively, indicating that the mixtures had been rendered infusible.

EXAMPLE 11

The following mixtures were treated as described in Example 8: (A) 2.863 g polycarbosilane, 0.109 g (3.81 percent) vinylsiloxane, and 20 microliters of a 0.1M isopropanol solution of chloroplatinic acid (0.014 percent as Pt); and (B) 1.837 g polycarbosilane, 0.114 g (6.20 percent) polybutadiene (45 percent vinyl), and 12 microliters of a 0.1M isopropanol solution of chloroplatinic acid (0.013 percent as Pt). The vinylsiloxane used in A was a linear polymer of the general formula [(CH$_2$=CH)CH$_3$SiO]$_x$ which contained a minimum of 27.5 percent vinyl and had a viscosity of 20 to 80 centistokes at 25° C. Both mixtures were heated treated at 260° C. for 20.5 hours. A and B contained 13.0 and 30.6 percent toluene insoluble material, respectively, indicating that the mixtures had been rendered infusible. The insoluble material of sample B contained 0.71 percent oxygen.

EXAMPLE 12

The following mixtures, all of which contain 20 microliters of a 0.1M isopropanol solution of chloroplatinic acid, were treated as described in Example 8: (A) 1.977 g polycarbosilane, 0.150 g (7.59 percent) vinylsiloxane, and 0.020 percent Pt; (B) 2.093 g polycarbosilane, 0.312 g (14.91 percent) vinylsiloxane, 0.019 percent Pt; (C) 1.999 g polycarbosilane, 0.152 g (7.60 percent) [(CH$_3$)$_2$(CH$_2$=CH)Si]$_2$O, and 0.020 percent Pt; (D) 2.011 g polycarbosilane, 0.350 g (17.40 percent) [(CH$_3$)$_2$(CH$_2$=CH)Si]$_2$O, and 0.019 percent Pt; (E) 2.167 g polycarbosilane, 0.169 g (7.80 percent) polybutadiene (45 percent vinyl), and 0.018 percent Pt; and (F) 2.00 g polycarbosilane, 0.312 g (15.60 percent) polybutadiene (45 percent vinyl), and 0.020 percent Pt. The vinylsiloxane used in A and B was as described in Example 8. All samples were treated at 180° C. for 64 hours. The following results were obtained.

| Sample | Unsaturated Compound Identity | Percentage | Toluene Insoluble, % |
| --- | --- | --- | --- |
| A | vinylsiloxane | 7.59 | 13.0 |
| B | vinylsiloxane | 14.91 | 16.0 |
| C | [(CH$_3$)$_2$(CH$_2$=CH)Si]$_2$O | 7.60 | 16.0 |
| D | [(CH$_3$)$_2$(CH$_2$=CH)Si]$_2$O | 17.70 | 41.0 |
| E | polybutadiene | 7.80 | 16.0 |
| F | polybutadiene | 15.60 | 34.0 |

This example shows that the amount of cure generally increases with an increase in the amount of unsaturation present.

EXAMPLE 13

The following mixtures were treated as described in Example 8: (A) 1.036 g polycarbosilane, 0.077 g (7.73 percent) vinylsiloxane, and 0.014 g of the reaction product of chloroplatinic acid and excess [(CH$_3$)$_2$(CH$_2$=CH)Si]$_2$O (0.054 percent as Pt; the catalyst/siloxane mixture itself contained 4.02 percent Pt); (B) 1.083 g polycarbosilane, 0.155 g (14.3 percent) vinylsiloxane, and 0.012 g of the reaction product of chloroplatinic acid and excess [(CH$_3$)$_2$(CH$_2$=CH)Si]$_2$O (0.044 percent as Pt; the catalyst/siloxane mixture itself contained 4.02 percent Pt); (C) 1.158 g polycarbosilane, 0.153 g (13.2 percent) vinylsiloxane, and 0.030 g tris(di-n-butylsulfide)rhodium(I) chloride (0.41 percent as Rh); (D) 1.299 g polycarbosilane, 0.067 g (5.16 percent) polybutadiene (45 percent vinyl), and 0.015 g of the reaction product of chloroplatinic acid and excess [(CH$_3$)$_2$(CH$_2$=CH)Si]$_2$O (0.046 percent as Pt; the catalyst/siloxane mixture itself contained 4.02 percent Pt); (E) 1.059 g polycarbosilane, 0.172 g (16.2 percent) polybutadiene (45 percent vinyl), and 0.015 g of the reaction product of chloroplatinic acid and excess [(CH$_3$)$_2$(CH$_2$=CH)Si]$_2$O (0.057 percent as Pt; the catalyst/siloxane mixture itself contained 4.02 percent Pt); and (F) 1.067 g polycarbosilane, 0.150 g (14.1 percent) polybutadiene (45 percent vinyl), and 0.036 g tris(di-n-butylsulfide)rhodium(I) chloride (0.54 percent as Rh). The vinylsiloxane used in A, B-, and C was as described in Example 8. All samples were treated at 180° C. for 64 hours. The following results were obtained.

| Sample | Unsaturated Compound | | | Toluene Insoluble, % |
|---|---|---|---|---|
| | Identity | Percentage | Catalyst | |
| A | vinylsiloxane | 7.7 | Pt | 23.3 |
| B | vinylsiloxane | 14.3 | Pt | 30.6 |
| C | vinylsiloxane | 13.2 | Rh | 21.3 |
| D | polybutadiene | 5.2 | Pt | 17.1 |
| E | polybutadiene | 16.2 | Pt | 43.0 |
| F | polybutadiene | 14.1 | Rh | 37.3 |

For a given catalyst, there is a general trend for increased cure as the amount of unsaturation increases.

EXAMPLE 14

The following mixture was treated as described in Example 8: 1.057 g polycarbosilane, 0.108 g (10.2 percent) of the vinylsilane CH$_3$(CH$_2$=CH)$_2$SiCH$_2$CH$_2$Si(CH$_2$=CH)$_2$CH$_3$, and 20 microliters of a 0.10M isopropanol solution of chloroplatinic acid (0.037 percent Pt). After heat treatment in a sealed tube at 250° C. for 27 hours the mixture contained 51 percent insoluble material indicating that the mixture had been cured sufficiently to have been rendered infusible.

That which is claimed is:

1. A method of rendering a preceramic polycarbosilane composition infusible prior to pyrolysis, which method comprises treating the preceramic polycarbosilane composition at a temperature of 150° to 400° C. under an inert atmosphere or vacuum for a time sufficient to render the preceramic composition infusible wherein the preceramic composition contains
   (1) a polycarbosilane containing at least 0.1 weight percent Si-H groups,
   (2) a hydrosilylation catalyst, of the platinum metal group, and
   (3) an unsaturated compound selected from the group consisting of reactive alkynes, polyolefins, vinylsilanes, and unsaturated siloxanes.

2. A method as defined in claim 1 wherein the polycarbosilane contains from 0.2 to 5.0 weight percent Si-H groups and the preceramic polycarbosilane composition is rendered infusible by treatment at a temperature of 300° to 400° C.

3. A method as defined in claim 2 wherein the hydrosilylation catalyst is present at a metal level of one part per million to 0.5 weight percent based on the weight of the polycarbosilane and the unsaturated compound is present at a level of 2 to 5 weight percent based on the weight of the polycarbosilane.

4. A method as defined in claim 3 wherein the hydrosilylation catalyst contains platinum and the unsaturated compound is a reactive alkyne.

5. A method as defined in claim 3 wherein the hydrosilylation catalyst contains platinum and the unsaturated compound is a polyolefin.

6. A method as defined in claim 3 wherein the hydrosilylation catalyst contains platinum and the unsaturated compound is a vinylsilane.

7. A method as defined in claim 3 wherein the hydrosilylation catalyst contains platinum and the unsaturated compound is an unsaturated siloxane.

8. A method as defined in claim 3 wherein the hydrosilylation catalyst contains rhodium and the unsaturated compound is a reactive alkyne.

9. A method as defined in claim 3 wherein the hydrosilylation catalyst contains rhodium and the unsaturated compound is a polyolefin.

10. A method as defined in claim 3 wherein the hydrosilylation catalyst contains rhodium and the unsaturated compound is a vinylsilane.

11. A method as defined in claim 3 wherein the hydrosilylation catalyst contains rhodium and the unsaturated compound is an unsaturated siloxane.

12. A method as defined in claim 3 wherein the hydrosilylation catalyst is present at a level of ten parts per million to 0.1 weight percent as the metal.

13. A method as defined in claim 3 wherein the hydrosilylation catalyst is selected from the group consisting of (1) chloroplatinic acid and (2) the reaction product of chloroplatinic acid and at least one organosilicon compound of the formula

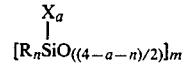

where R is selected from the group consisting of monovalent hydrocarbon and monovalent halohydrocarbon radicals, at least one of the R groups containing terminal aliphatic unsaturation; X is a hydrolyzable group; n has an average value of 1.5 to 4; m has an average value of 1 to 20; and a has an average value of 0 to 2.5.

14. A method as defined in claim 3 wherein the preceramic polycarbosilane composition is in the form of a fiber.

15. A method as defined in claim 12 wherein the preceramic polycarbosilane composition is in the form of a fiber.

16. A method as defined in claim 13 wherein the preceramic polycarbosilane composition is in the form of a fiber.

17. A method of rendering a preceramic polycarbosilane composition infusible prior to pyrolysis, which method comprises treating the preceramic composition with a gas selected from the group consisting of reactive diolefins, reactive alkynes, and vinylsilanes at a temperature of 150° to 400° C. for a time sufficient to render the preceramic composition infusible wherein the preceramic composition contains
(1) a polycarbosilane containing at least 0.1 weight percent Si-H groups and
(2) a hydrosilylation catalyst.

18. A method as defined in claim 17 wherein the hydrosilylation catalyst is present at a metal level of one part per million to 0.5 weight percent based on the weight of the polycarbosilane and the unsaturated compound is present at a level of 2 to 5 weight percent based on the weight of the polycarbosilane.

19. A method as defined in claim 18 wherein the polycarbosilane contains from 0.2 to 5.0 weight percent Si-H groups.

20. A method as defined in claim 19 wherein the hydrosilylation catalyst contains platinum and is present at a platinum level of ten parts per million to 0.1 weight percent based on the polycarbosilane weight.

21. A method as defined in claim 19 wherein the hydrosilylation catalyst contains rhodium and is present at a rhodium level of ten parts per million to 0.1 weight percent based on the polycarbosilane weight.

22. A method as defined in claim 19 wherein the gas is a reactive diolefin and wherein the preceramic polycarbosilane composition is in the form of a fiber.

23. A method as defined in claim 19 wherein the gas is a reactive alkyne and wherein the preceramic polycarbosilane composition is in the form of a fiber.

24. A method as defined in claim 19 wherein the gas is a vinylsilane and wherein the preceramic polycarbosilane composition is in the form of a fiber.

25. A preceramic polymer composition consisting essentially of
(1) a polycarbosilane containing at least 0.1 weight percent Si-H groups,
(2) a hydrosilylation catalyst of the platinum metal group, and
(3) an unsaturated compound selected from the group consisting of reactive diolefins, reactive alkynes, polyolefins, vinylsilanes, and unsaturated siloxanes.

26. A composition as defined in claim 25 wherein the hydrosilylation catalyst contains platinum and is present at a platinum level of ten parts per million to 0.1 weight percent based on the weight of the polycarbosilane.

27. A composition as defined in claim 26 wherein the hydrosilylation catalyst is selected from the group consisting of (1) chloroplatinic acid and (2) the reaction product of chloroplatinic acid and at least one organosilicon compound of the formula

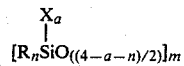

where R is selected from the group consisting of monovalent hydrocarbon and monovalent halohydrocarbon radicals, at least one of the R groups containing terminal aliphatic unsaturation; X is a hydrolyzable group; n has an average value of 1.5 to 4; m has an average value of 1 to 20; and a has an average value of 0 to 2.5.

28. A composition as defined in claim 25 wherein the hydrosilylation catalyst contains rhodium and is present at a rhodium level of ten parts per million to 0.1 weight percent based on the weight of the polycarbosilane.

29. A composition as defined in claim 25 wherein the unsaturated compound is a polyolefin.

30. A composition as defined in claim 25 wherein the unsaturated compound is a unsaturated siloxane.

31. A composition as defined in claim 25 wherein the hydrosilylation catalyst is present at a level of one part per million to 0.5 weight percent based on the weight of the polycarbosilane and the unsaturated compound is present at a level of 0.5 to 20 weight percent based on the weight of the polycarbosilane.

32. A composition as defined in claim 31 wherein the hydrosilylation catalyst is present at a level of ten parts per million to 0.1 weight percent based on the weight of the polycarbosilane and the unsaturated compound is present at a level of 2 to 5 weight percent based on the weight of the polycarbosilane.

* * * * *